Feb. 23, 1971 LE ROY F. JOHNSON 3,566,256
FREQUENCY SWEPT SIDEBAND GYROMAGNETIC RESONANCE SPECTROMETER
Filed June 16, 1969
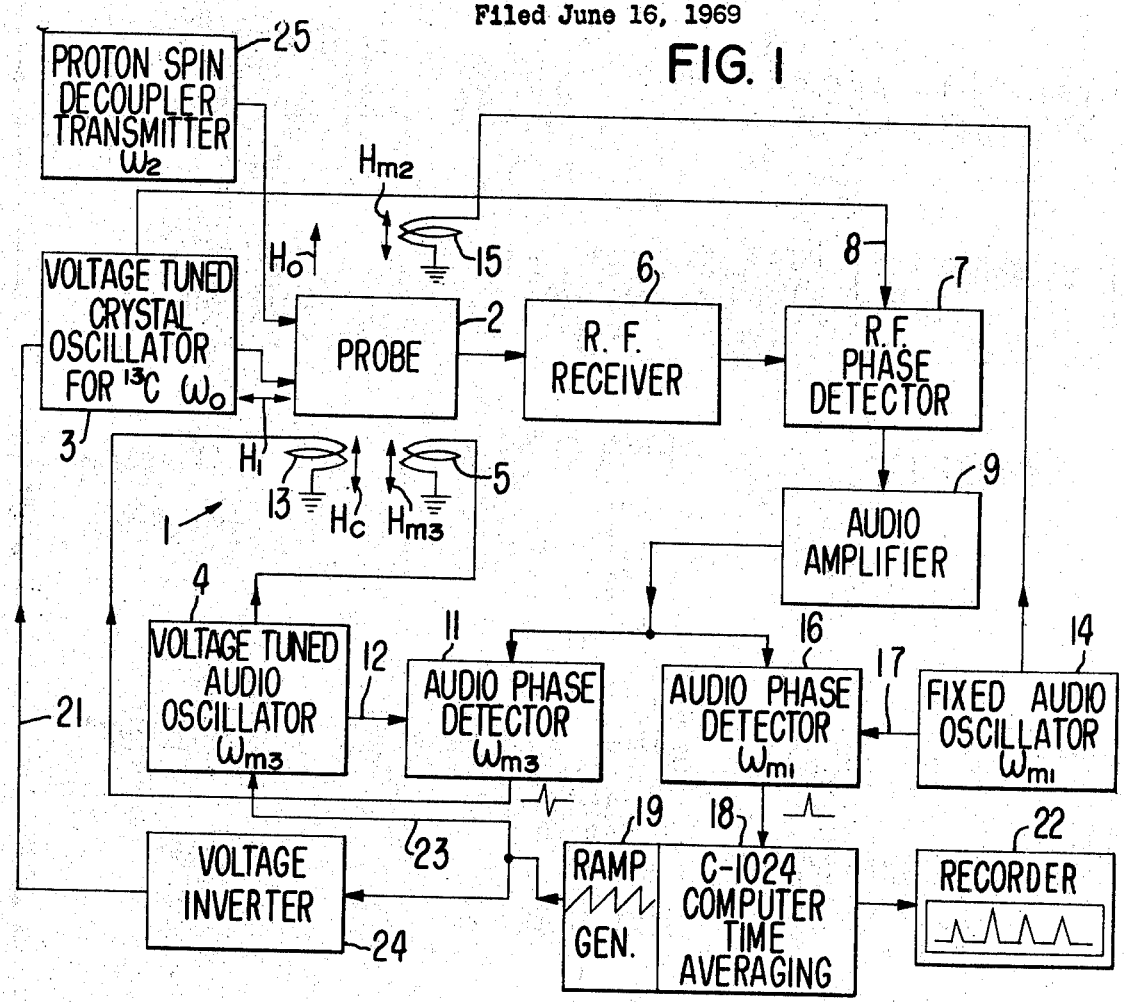
FIG. 1
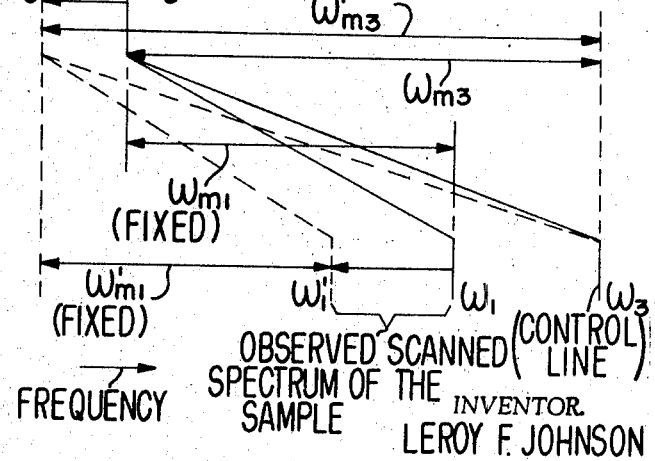
FIG. 2
FIG. 3
PRIOR ART
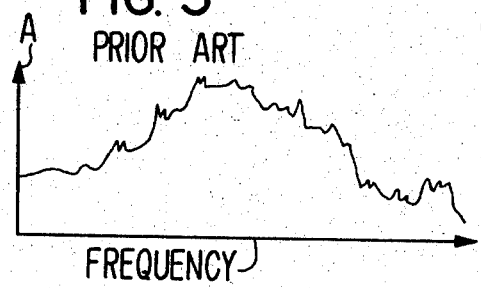
FIG. 4
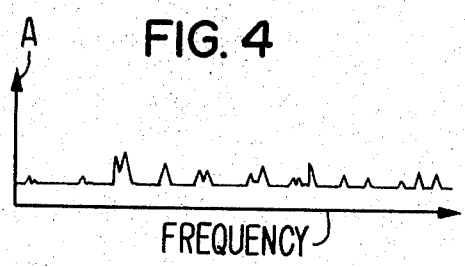
INVENTOR.
LEROY F. JOHNSON
BY *Stanley Z. Cole*
ATTORNEY

United States Patent Office 3,566,256
Patented Feb. 23, 1971

3,566,256
FREQUENCY SWEPT SIDEBAND GYROMAGNETIC RESONANCE SPECTROMETER
Le Roy F. Johnson, Cupertino, Calif., assignor to Varian Associates, Palo Alto, Calif., a corporation of California
Filed June 16, 1969, Ser. No. 833,477
Int. Cl. G01n 27/78
U.S. Cl. 324—.5   7 Claims

ABSTRACT OF THE DISCLOSURE

A frequency swept sideband gyromagnetic resonance spectrometer is disclosed wherein a radio frequency carrier signal is combined with first and second audio modulation frequencies to excite sideband resonances of both a field-frequency control group and a sample under analysis. The carrier frequency is swept in frequency in one sense to sweep one sideband through the resonance spectrum of the sample with a fixed frequency audio modulation, whereas the audio modulation frequency to produce the control sideband is swept in the opposite frequency sense to that of the carrier to produce a fixed sideband frequency for exciting the control group.

DESCRIPTION OF THE PRIOR ART

Heretofore, sideband gyromagnetic resonance spectrometers have employed separate sidebands of affixed frequency carrier to excite resonance of a field-frequency control group and of the resonance spectrum of a sample under analysis. In this prior spectrometer the audio frequency modulation used to generate the control frequency sideband was scanned in frequency to produce a scan of the controlled polarizing magnetic field through the resonance spectrum of the sample. This system has the advantage of producing constant phase shift across the resonance spectrum of the sample and of producing constant modulation index across the spectrum. However attendant disadvantages include a swept frequency for the control channel, making it difficult to maintain a field-frequency control lock, especially with weak control spectral lines as obtained in $C^{13}$ investigations, and especially during the faster reverse scan required to return to the initial frequency for subsequent scanning. Also spin decoupling is difficult because the spin decoupling frequency must be swept in synchronism with the sweep of the polarizing magnetic field intensity.

In other prior art sideband spectrometers, the field-frequency control sideband is fixed in frequency and the sample sideband is swept in frequency through the spectrum of the sample. This has the advantage that field-frequency control lock is easier to maintain with weak control resonance lines and spin decoupling may be achieved with fixed frequency. However, the swept sample sideband channel is plagued by variable phase shift, changes in the modulation index and by a coherent frequency dependent variable coupling of the audio modulation into the receiver. This latter effect shows up in the recorded spectrum as a substantial variation in the height of the base line, known in the art as "potato," thereby making it difficult to differentiate true weak resonance lines from base line variations.

SUMMARY OF THE PRESENT INVENTION

The principal object of the present invention is the provision of an improved sideband gyromagnetic resonance spectrometer.

One feature of the present invention is the provision in a frequency swept sideband gyromagnetic resonance spectrometer of a radio frequency carrier which is frequency swept in one sense to produce a scan of the spectrum of the sample and an audio modulation of the carrier which is frequency swept in the opposite sense to obtain a fixed frequency field-frequency control sideband, whereby field-frequency control is readily maintained with relatively weak control lines.

Another feature of the present invention is the same as the preceding feature wherein the swept carrier frequency is audio modulated with a fixed audio frequency to produce a frequency swept sideband of the carrier for exciting the resonance spectrum of the sample under analysis, whereby variations in the height of the base line of the resonance spectrum are eliminated.

Another feature of the present invention is the same as any one or more of the preceding features wherein a time averaging computer is provided for time averaging the separate spectral lines of the sample for repetitive scans of the spectrum and wherein R.F. and audio frequency sweep control signals are derived from the computer for synchronizing the frequency sweep of the carrier with the frequency sweep of the audio modulation used to produce the fixed frequency field-frequency control sideband.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a gyromagnetic resonance spectrometer employing features of the present invention, FIG. 2 is a vertically expanded spectral diagram depicting the relation between the carrier and certain sideband frequencies employed in the spectrometer of FIG. 1, FIG. 3 is a prior art resonance spectrum displaying variations in the height of the base line, and FIG. 4 is a resonance spectrum obtained from the spectrometer of the present invention.

DESCRIPTION OF THE PREFERRED EMBODIMENTS

Referring now to FIG. 1, there is shown a homonuclear frequency swept sideband gyromagnetic resonance spectrometer 1 of the present invention incorporating heteronuclear spin decoupling. The spectrometer 1 includes a probe 2 for immersing a sample of matter to be investigated and a field-frequency control group of gyromagnetic bodies in a polarizing D.C. magnetic field $H_0$. A typical sample material would inculde hydrocarbons such as naphthenic gasoline for which a spectrum from the aliphatic $^{13}C$ nuclei is to be obtained. A suitable homonuclear field-frequency control group would include the $^{13}C$ nuclei of $^{13}CH_3I$. The heteronuclear spin systems to be spin decoupled would include the protons of the hydrogen constitutents of the sample to be investigated.

A voltage tunable crystal oscillator 3 serves as a radio frequency transmitter for supplying radio frequency energy to the probe 2. The radio frequency energy is introduced such that a radio frequency magnetic field $H_1$, at a carrier frequency $\omega_0$ near the resonance frequency of the sample and control group $^{13}C$, is produced within the sample and control groups at right angles to the polarizing magnetic field $H_0$. A voltage tunable audio oscillator 4 supplies audio frequency energy to a field modulation coil 5 at a frequency $\omega_{m3}$ such that a resultant audio magnetic field modulation component $H_{m3}$ is combined with the R.F. carrier frequency field component $H_1$ in the sample and control groups to produce an R.F. sideband of the carrier at the resonant frequency $\omega_3$ of the field-frequency control group (see FIG. 2) for exciting resonance of the control group.

The resonance signal emanating from the control group is picked up by the receiver coil in the probe 2 and fed to a radio frequency receiver 6 wherein it is amplified and fed to one input of a radio frequency phase detector 7. In the phase detector 7, the control resonance signal is phase detected against a sample of the carrier signal derived from the crystal oscillator 3 via lead 8. The output of the phase detector 7 is an audio frequency resonance signal at the frequency $\omega_{m3}$ of the audio oscillator 4. This output is fed to an audio amplifier 9 wherein it is amplified and thence fed to one input of an audio frequency phase detector 11 for phase detection against a sample of the audio oscillator frequency $\omega_{m3}$ derived from audio oscillator 4 via lead 12. The phase of the input signals to the audio phase detector 11 are adjusted such that the output of the audio phase detector 11 is a pure dispersion mode D.C. resonance signal which is fed to a flux stabilizer coil 13 to produce a corrective polarizing magnetic field component $H_c$ superimposed on the polarizing magnetic field $H_0$ to maintain resonance of the field-frequency control group.

Similarly, a second audio frequency oscillator 14 supplies fixed frequency audio frequency energy at $\omega_{m1}$ to a second field modulation coil 15. Coil 15 produces an audio frequency magnetic field modulation component $H_{m1}$ which is combined with the R.F. carrier frequency field component $H_1$ in the sample to produce an R.F. sideband of the carrier at the resonant frequency $\omega_1$ of the sample under analysis for exciting resonance of the sample. The second field modulation coil 15 is shown only for ease of explanation. Actually only one set of field modulation coils 5 is used for both $\omega_{m1}$ and $\omega_{m3}$ modulation. In which case $\omega_{m1}$ and $\omega_{m2}$ are fed to a summing amplifier, not shown, and then the composite modulation is amplified by a compensated driver amplifier and fed to the one set of coils.

Resonance signals emanating from the sample are picked up by the receiver coil in the probe 2, amplified by receiver 6, and phase detected in phase detector 7 against a sample of the carrier signal at $\omega_0$ to produce an audio frequency resonance signal at the output of the phase detector 7. The audio resonance signal at the fixed second audio frequency $\omega_{m1}$ is amplified by amplifier 9 and phase detected by an audio phase detector 16 against a sample of the audio oscillator frequency derived from the audio oscillator 14 via lead 17. The phases of the input signals to the audio phase detector 16 are adjusted to produce an absorption mode D.C. resonance output signal which is fed to a time averaging computer 18, such as a C–1024.

The computer includes a ramp generator 19 for generating a ramp voltage employed for frequency sweeping the spectrometer. One sample of the ramp voltage is fed to the voltage tuned crystal oscillator 3 via lead 21 for sweeping the carrier frequency $\omega_0$ (see FIG. 2) in one frequency sense, such as down in frequency. This causes the sample resonance observing sideband of the carrier, at $\omega_1$, to be swept through successive resonance lines of the sample to produce an output spectrum at the output of the second audio phase detector 16. Each spectrum signal is sampled at certain time displaced intervals, converted to digital form and stored in the memory of the computer 18. Spectral data derived from successive scans of a given spectrum is added in the separate channels of the computer to obtain a time averaged or enhanced signal-to-noise ratio since noise adds only as the $\sqrt{n}$, where $n$ is the number of scans, whereas the coherent signal adds in proportion to $n$. The time averaged signals are read out of the computer and portrayed in graphical form on an X–Y recorder 22.

Another sample of the ramp voltage is also fed from the ramp generator 19 to the field-frequency control voltage tunable audio oscillator 4 via lead 23 for sweeping the audio modulation frequency $\omega_{m3}$ in an equal and opposite frequency sense to the frequency sweep of the carrier frequency such that the field-frequency control sideband frequency $\omega_3$ remains fixed. Oscillators 3 and 4 can have voltage tuning coefficients of opposite sense or they may have voltage tuning coefficients of the same sense and a voltage inverter 24 may be employed in one of the leads 21 or 23 for tuning the oscillators 3 and 4 in opposite frequency senses.

The linearity of the field-frequency audio oscillator over its swept range of frequency, as of 10 kHz., is preferably ±0.1% or better. The linearity of the swept voltage tunable R.F. oscillator 3 need not be as precise. For example, over a swept range of 10 kHz. a linearity of ±1% is adequate since the field-frequency control lock corrects the magnetic field to compensate for nonlinearity of the carrier sweep.

Since the effective R.F. frequency $\omega_3$ for field-frequency control is fixed, the spectrometer can stay locked to relatively weak control spectral lines. The fixed radio frequency lock channel requires only a relatively low audio modulation index, therefore, even though the audio portion of the sideband is frequency swept, potato in the lock channel is reduced to a very low level and causes no problems in maintaining a proper field-frequency lock. As regards the sample observation channel, the audio field modulation component $\omega_{m1}$ is fixed in frequency such that the potato that is present does not vary as the spectrum is swept. Thus, there are no unwanted variations in the baseline of the observed spectrum. The baseline will have a fixed offset which is readily corrected by changing the baseline level for the recorded spectrum.

FIG. 3 shows the prior art spectrum obtained from a conventional frequency swept spectrometer and exhibiting potato effects, whereas FIG. 4 shows the same spectrum run on the frequency swept spectrometer of the present invention.

Referring back again to FIG. 1, the spectrometer 1 is essentially a frequency swept system and therefore spin decoupling is readily achieved with a fixed frequency radio frequency source. Accordingly, a heteronuclear decoupling of the protons of the sample from the $^{13}C$ nuclei is readily obtained by feeding radio frequency energy at the resonant frequency $\omega_2$ of the protons from a transmitter 25 to the transmitter coils of the probe 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance spectrometer, means for immersing a gyromagnetic resonance sample substance to be investigated and a gyromagnetic resonance control group in a polarizing magnetic field, means for applying alternating magnetic fields to the sample and control group to excite gyromagnetic resonance of both the sample substance and the control group in the polarizing magnetic field, means for detecting gyromagnetic resonance of both the sample substance and the control group, means responsive to the detected resonance of the control group for correcting the intensity of the polarizing magnetic field to maintain resonance of the control group at a substantially fixed radio frequency, means for scanning the frequency of the alternating magnetic field applied to the sample substance to scan through at least a certain portion of the resonance spectrum of the sample, the improvement wherein, said means for applying alternating magnetic fields to the sample and control group includes a radio frequency transmitter producing radio frequency carrier energy, means for combining the carrier frequency energy with audio frequency energy to produce a sideband of the carrier at the fixed resonance frequency of the control group, means for sweeping the frequencies of the carrier energy and of the audio frequency energy in opopsite frequency senses to scan resonance of the sample in one sense while maintaining the frequency of the sideband energy at the fixed resonance frequency of the control group.

2. The apparatus of claim 1 including means for combining the carrier frequency energy with fixed frequency audio frequency energy to produce a second sideband of the carrier which is frequency swept by sweep of the carrier frequency through the certain portion of the resonance spectrum of the sample.

3. The apparatus of claim 2 including a time averaging computer for adding together the same spectral line components, derived from successive scans of the certain portion of the resonance spectrum, in respective channels of a memory of the computer to obtain enhanced signal-to-noise ratio for the resonance spectrum of the sample.

4. The apparatus of claim 3 wherein said computer includes means for generating a frequency sweep control signal for sweeping the carrier frequency and the first audio modulation frequency in opposite frequency senses.

5. The apparatus of claim 2 including means for generating second radio frequency energy at the resonance frequency of a second kind of gyromagnetic resonant bodies within the sample, other than the first kind of gyromagnetic resonant bodies the resonance spectrum of which is being excited and detected by the first radio frequency energy, for spin decoupling said second kind of gyromagnetic resonant bodies from said first kind of gyromagnetic resonant bodies.

6. The apparatus of claim 2 wherein said radio frequency transmitter includes a voltage tunable crystal oscillator for generating the carrier radio frequency energy, and wherein said frequency sweep means sweeps the carrier frequency by applying a sweep voltage to said voltage tunable crystal oscillator.

7. The apparatus of claim 6 including a voltage tunable audio oscillator for generating the audio frequency energy for combining with the carrier frequency to produce the sideband energy at the resonance frequency of the control group, and wherein said frequency sweeping means sweeps the audio frequency by applying a sweep voltage to said voltage tunable audio oscillator.

References Cited

UNITED STATES PATENTS

| | | | |
|---|---|---|---|
| 3,496,454 | 2/1970 | Nelson | 324—0.5 |
| 3,500,178 | 3/1970 | Paitich | 324—0.5 |

MICHAEL J. LYNCH, Primary Examiner